United States Patent
Rits et al.

(10) Patent No.: US 7,805,325 B2
(45) Date of Patent: Sep. 28, 2010

(54) METHOD AND SYSTEM FOR SECURED EXECUTION OF AN ACTIVITY IN A WORKFLOW PROCESS

(75) Inventors: Maarten Rits, Nice (BE); Yevgen Reznichenko, Hamburg (DE); Pascal Spadone, Antibes (FR)

(73) Assignee: SAP AG, Walldorf (DE)

( * ) Notice: Subject to any disclaimer, the term of this patent is extended or adjusted under 35 U.S.C. 154(b) by 684 days.

(21) Appl. No.: 11/358,769

(22) Filed: Feb. 17, 2006

(65) Prior Publication Data

US 2007/0033079 A1    Feb. 8, 2007

(30) Foreign Application Priority Data

Aug. 4, 2005    (EP)    ............................. 05291686

(51) Int. Cl.
  *G06F 9/46*    (2006.01)
(52) U.S. Cl. .......................................................... 705/8
(58) Field of Classification Search .................... 705/8
  See application file for complete search history.

(56) References Cited

U.S. PATENT DOCUMENTS

| | | | | |
|---|---|---|---|---|
| 6,629,081 | B1 * | 9/2003 | Cornelius et al. | 705/30 |
| 7,020,645 | B2 * | 3/2006 | Bisbee et al. | 707/1 |
| 7,024,669 | B1 * | 4/2006 | Leymann et al. | 718/100 |
| 7,100,195 | B1 * | 8/2006 | Underwood | 726/2 |
| 7,155,720 | B2 * | 12/2006 | Casati et al. | 718/104 |
| 7,383,575 | B2 * | 6/2008 | Cheston et al. | 726/16 |
| 7,577,554 | B2 * | 8/2009 | Lystad et al. | 703/2 |
| 2002/0184217 | A1 * | 12/2002 | Bisbee et al. | 707/9 |
| 2003/0149714 | A1 * | 8/2003 | Casati et al. | 709/100 |
| 2004/0162741 | A1 * | 8/2004 | Flaxer et al. | 705/7 |
| 2005/0043982 | A1 * | 2/2005 | Nguyen | 705/8 |
| 2005/0138399 | A1 * | 6/2005 | Cheston et al. | 713/189 |
| 2005/0283786 | A1 * | 12/2005 | Dettinger et al. | 718/104 |
| 2006/0004749 | A1 * | 1/2006 | Dettinger et al. | 707/6 |

FOREIGN PATENT DOCUMENTS

| | | |
|---|---|---|
| WO | WO 99/28838 A1 | 10/1999 |
| WO | WO 03/081388 A2 | 10/2003 |

OTHER PUBLICATIONS

Bolcer et al., *Advanced Workflow Management Technologies*, http://www.ics.uci.edu/{taylor/documents/1998-AdvancedWorkflow.pdf, XP-002350592, Mar. 3, 1999, pp. 1-60.

(Continued)

*Primary Examiner*—Romain Jeanty
(74) *Attorney, Agent, or Firm*—Blakely Sokoloff Taylor & Zafman LLP

(57) ABSTRACT

A method and system to execute an activity in a workflow process. The method includes receiving a notification to execute the activity. The notification contains private information and public information relating to the activity. The method further includes removing the private information from the notification, providing the notification that contains the public information to users being affected by the activity, receiving a request to execute the activity from one or more of the users, and providing the private information to the users after verifying the request.

27 Claims, 3 Drawing Sheets

OTHER PUBLICATIONS

Riempp et al., *Workflow Management Between Distributed Organizations—The Wide Area GroupFlow Approach*, University of Paderborn, XP002124470, 1996, pp. 275-290.

*Workflow Management Coalition—Workflow Security Considerations—White Paper*, The Workflow Management Coalition Specification, Document No. WFMC-TC-1019, Document Status—Issue 1.0, http://www.aiim.org/wfmc/standards/docs/secure1.pdf, XP-002124399, Feb. 1998, pp. 1-15.

Ilanit et al., *A Secure Workflow Model Based on Distributed Constrained Role and Task Assignment for the Internet*, XP-002350593, Springer-Verlag Berlin Heidelberg 2004, http://springerlink.com/media/4g117bwxrn0kyphwrh5u/contributions/d/t/6/a/dt6abv5rkmjk0w0.pdf, pp. 171-186.

European Search Report for European Patent Application No. EP1755075, Mailed Oct. 24, 2005, 3 pages.

* cited by examiner

METHOD AND SYSTEM FOR SECURED EXECUTION OF AN ACTIVITY IN A WORKFLOW PROCESS

RELATED APPLICATION

The present application is related to and hereby claims the priority benefit of European Patent Application No. 05291686.3, filed Aug. 4, 2005, which is incorporated by reference.

FIELD OF THE INVENTION

An embodiment relates generally to the field of workflow management system. More particularly, an embodiment relates to a method and a system for secured execution of activities in a workflow process.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects that could not be undertaken individually or to offer composed services that could not be provided by individual organizations.

A growing array of workflow automation technologies has emerged to help organizations in a collaborative environment manage activities in the workflow process. In particular, workflow management applications are designed to electronically route the right information to the right participant at the right time. It enables the flow of work between participants within the same organization or different organizations to be defined and tracked.

Conventional workflow management systems, however, do not ensure that only an authorized user is permitted to perform an activity. Consequently, the integrity and security of the process can be compromised. For example, a task-list manager, whose function is to distribute activities among users, may have unlimited access to information relating to the activities. The access to confidential or private information is not necessary and should be avoided.

As established above, there is an increasing need for a secured workflow environment that enables identification of privileged participants, verifies access to private information relating to the activities and enforces control over the execution of activities.

SUMMARY OF THE INVENTION

According to one aspect of the invention, there is provided a method to execute an activity in a workflow process. The method includes receiving a notification to execute the activity. The notification contains private information and public information relating to the activity. The method further includes removing the private information from the notification, providing the notification that contains the public information to users being affected by the activity, receiving a request to execute the activity from one or more of the users, and providing the private information to the users after verifying the request.

According to a further aspect of the invention, there is provided a workflow management system for executing an activity in a workflow process. The system comprises a workflow engine for generating a notification containing a private information and a public information relating to the activity, a proxy for removing the private information from the notification and providing the private information to an authorized user, a tasklist manager for providing the notification that contains the public information to one or more users affected by the activity; and a security policy module for determining the authorized user from the one or more users.

Other features of the present invention will be apparent from the accompanying drawings and from the detailed description that follows.

BRIEF DESCRIPTION OF THE DRAWINGS

An embodiment of the invention is illustrated by way of example and not limitation by the figures of the accompanying drawings, in which like references indicate similar elements and in which.

DETAILED DESCRIPTION

A method and system for secure collaboration between users and the workflow management system in a workflow process is described. In the following description, for purposes of explanation, numerous specific details are set forth in order to provide a thorough understanding of an embodiment of the present invention. It will be evident, however, to one skilled in the art that the present invention may be practiced without these specific details.

A workflow process defines the activities for each user or organization in a collaborative environment. The activities represent the process that the user has to execute to perform his part of the work in the collaboration. The workflow process specifies the order of execution of these activities and establishes their interdependencies.

Figure 1:
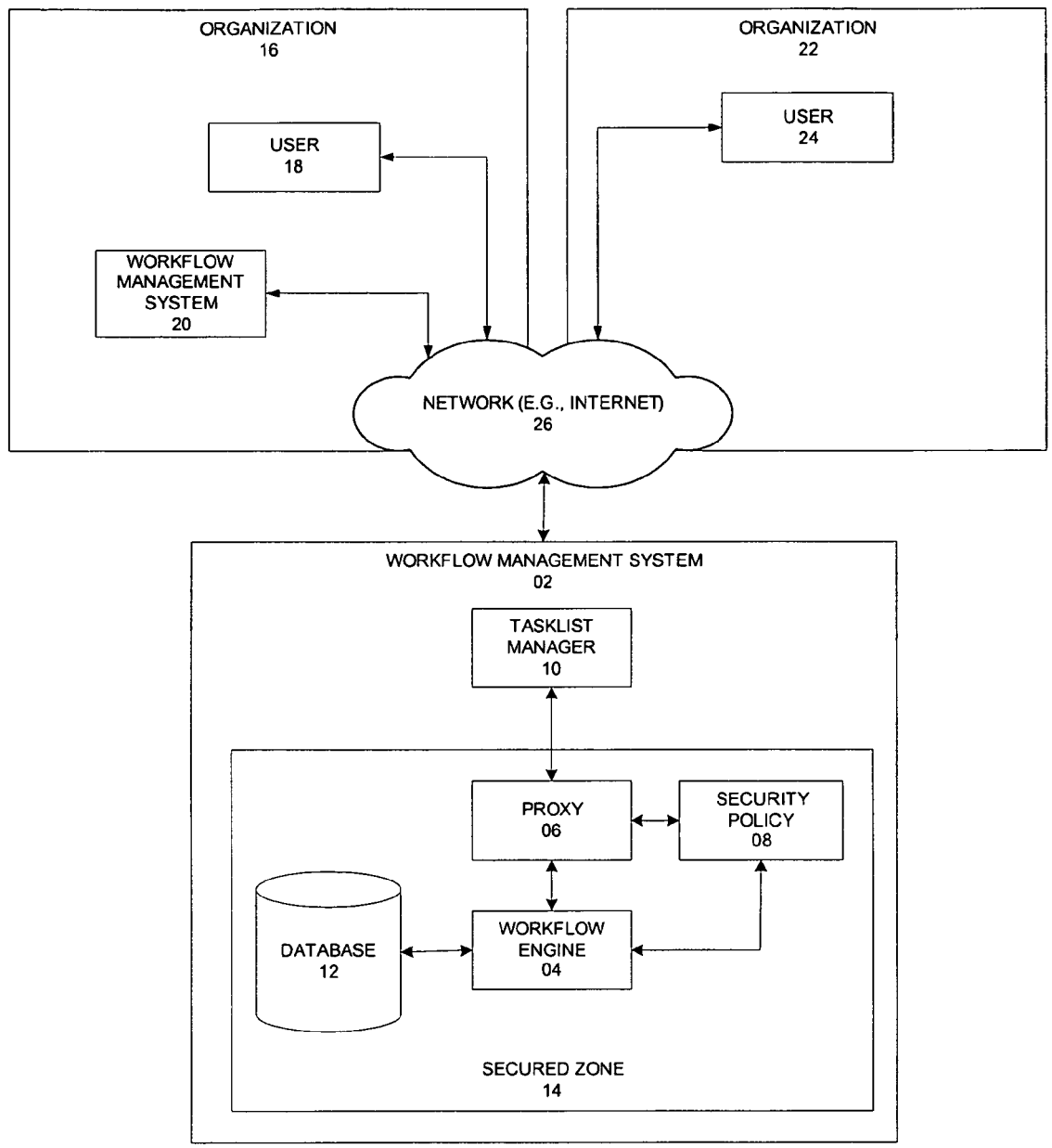
FIG. 1 illustrates an example of a workflow management system with a proxy feature in accordance with one embodiment of the invention.

FIG. 1 is a network diagram depicting a workflow management system 02, according to one exemplary embodiment of the invention. The workflow management system 02 provides management of workflow processes to users 18, 24 in a first organization 16 and a second organization 14. In addition, the workflow management system 02 may be peered with a remote workflow management system 20 to collaborate workflow processes.

In one embodiment, the workflow management system 02 contains the following modules: a workflow engine 04, a proxy 06, a security policy 08, a tasklist manager 10 and a database 12. These modules may be implemented in computer software for execution by a computer processor in accordance with the instructions embodied therein. The workflow engine 04 is the brain of the workflow management system 02 which orchestrates the relationships of the users and the activities. For example, the workflow engine 04 tracks the status of the activities and controls the sequence in which the activities are executed.

The workflow engine 04 is securely connected to the proxy 06. The proxy 06 is responsible for protecting the workflow engine 04. For example, the proxy 06 prevents unauthorized access to information provided by the workflow engine 04. In one embodiment of the invention, the proxy 06 takes over from the workflow engine 04 the complete interaction with external parties such as the tasklist manager 10, external applications (remote workflow management system 20) and users 18, 24. Direct interaction with the workflow engine 04 is allowed via the proxy 06. Therefore, the proxy 06 creates a secured zone 14 guarding the workflow engine 04 and trusted applications, such as database 12 and security policy 08.

In one exemplary embodiment of the invention, communication provided to external parties by the workflow engine 04 and vice versa is captured by the proxy 06. The proxy 06 verifies the communication according to the security policy 08. Stated differently, the proxy 06 ensures that only authorized communication is allowed with the workflow engine 04. The proxy 06 consults the security policy 08 which relates to authorization rules governing the workflow process. For example, the security policy 08 may include authentication policy and execution policy. Authentication policy ensures that only the right user has accessed to privileged information. Execution policy relates to the sequence in which the activities are executed. The security policy 08 may also include rules relating to infrastructure security or system security.

During the execution of an instance of a workflow process, some activities may need to be executed by users. The workflow engine 04 provides the security policy 08 with data information relating to the activity. The security policy 08 uses the data information to create the necessary authentication policy and execution policy. In one embodiment of the invention, the security policy 08 is configured to identify the data information as general information (hereinafter "public information") and critical or confidential information (hereinafter "private information"). Public information may relate to description of the activity while private information may include execution related data. The security policy 08 may employ different data classification techniques to determine the data as public information or private information. For example, the security policy 08 may classify data information relating to description of the activity as public information and all other data information as private information. In another example, the security policy 08 may deploy text recognition technique whereby data information relating to words such as "salary" and "pricing" are identified as private information. The security policy 08 organizes the data information and the corresponding classification in a table.

Once the security policy 08 has been established, the workflow engine 04 generates a notification to the proxy 06. The notification contains data information relating to the activity. The proxy 06 is designed to consult the security policy 08 to remove the private information from the notification prior to issuing the notification to affected users. Affected users are users who have the preliminary qualifications to perform an activity. However, the affected users need to be further verified in order to have the permission to perform the activity. The proxy 06 only provides the private information to verified users. This is particularly desirable in a cross-organizational environment or/and a role-based workflow process. A role-based approach does not consider the identity of the user, but assigned activities based on the role of the user. Frequently, a user with the specified role may not meet other requirements to execute the activity. For example, a manager from human resource department is a more appropriate participant than a manager from engineering department to decide on the salary scheme of the employees. Therefore, the invention prevents such user from accessing private information.

In one embodiment of the invention, the proxy 06 extracts the data information from the notification and verify with the security policy 08 to identify public information and private information. Thereafter, the proxy 06 reconstructs a notification containing only public information. In one example, the original notification is a simple data structure representing the list of data information. The reconstructed notification shares the same data structure as the original notification. The proxy 06 copies data information which is identified as public information from the original notification to the reconstructed notification. Similarly, the proxy 06 constructs a notification with private information by coping only private information from the original notification.

In a further embodiment of the invention, the proxy 06 is designed to provide only relevant private information to a user. That is, instead of allowing a verified user to have unlimited access to the private information, the verified user is permitted to access only relevant private information. To achieve restricted access control, the workflow engine 04 provides the security policy 08 with the user role for the corresponding data information. For example, the role "Manager from engineering" is associated with performance rating information and the role "Manager from human resource" with salary adjustment information. The security policy 08 stores the user role with the corresponding data information in the table as described above. This enables the proxy 06 to verify with the security policy 08 to provide the relevant private information to the users.

Clearly, the present invention provides the advantage of ensuring only verified users have access to relevant private information. In addition, the present invention prevents a user from receiving unnecessary amount of information. For example, an affected user may choose not to accept the activity after receiving the public information. Therefore, the affected user is not overloaded with unnecessary information, in this case, the private information.

The proxy 06 is connected to the tasklist manager 10 which is the gateway of the workflow management system 02 to users. The function of the tasklist manager 10 is to distribute the activities to the users. The tasklist manager 10 has the ability to directly interact or cause interaction with a user via another application. In one embodiment of the invention, the tasklist manager 10 does not have to be trusted. A malicious tasklist manager will only be able to hold back tasks for users and will not be able to compromise the running workflow instances or provide unauthorized activities to the users.

Figure 2:
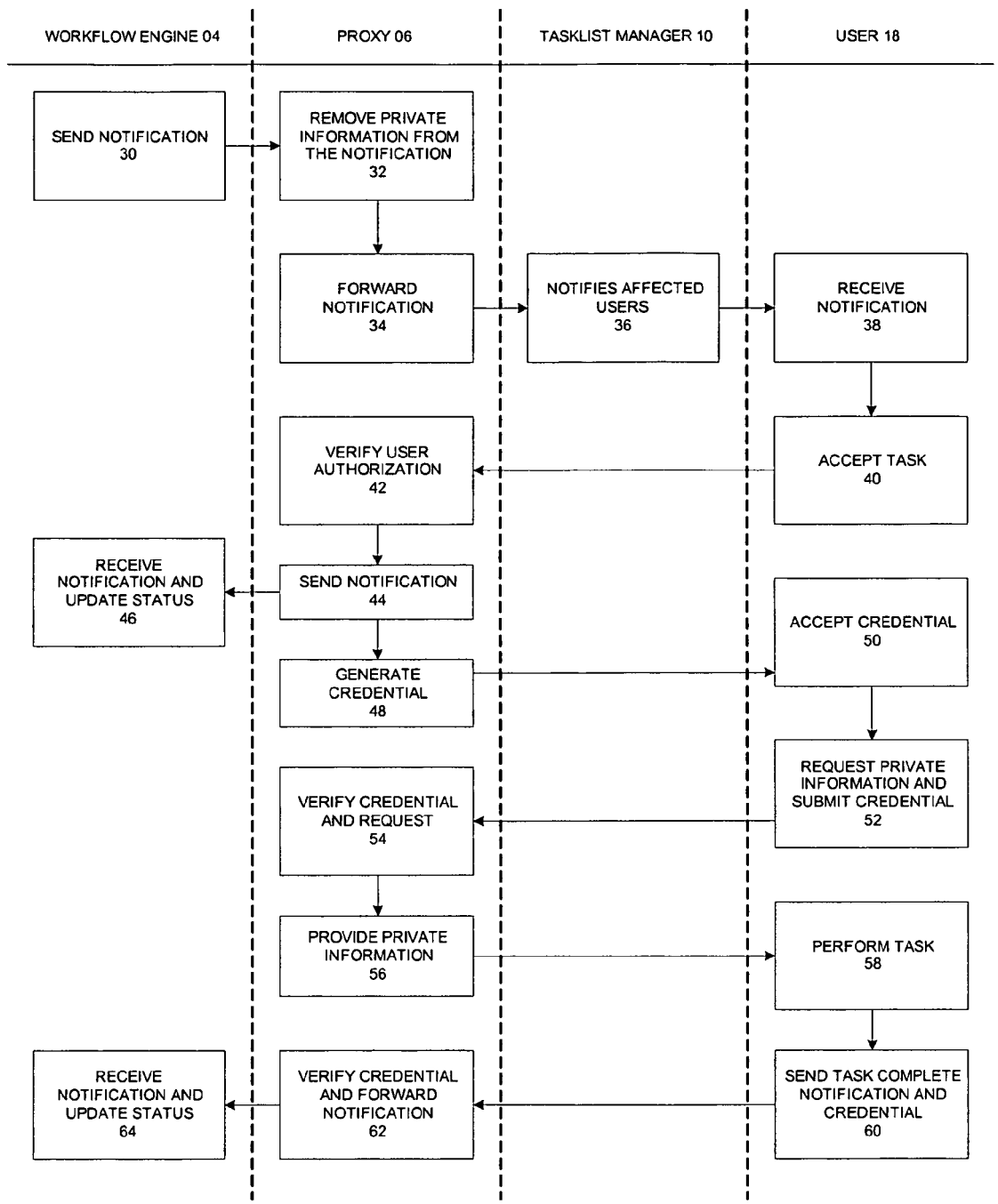
FIG. 2 is an interaction flow chart illustrating the activities between the workflow management system and a user in accordance to one embodiment of the invention.

The interactions between the various modules of the workflow management system 02 and the user are further illustrated in FIG. 2 in accordance to one embodiment of the invention. The process begins at step 30 wherein the workflow engine 04 sends a notification to the proxy 06 to initiate an execution of an activity by a user. As described above, the notification usually contains public information relating to general description of the activity and private information which are specific instructions and workflow data for executing the activity. In response, the proxy 06 removes the private information from the notification (step 32) and forwards the notification to the tasklist manager 10 (step 34). It will be noted that the notification received by the tasklist manger 10 contains only public information.

The tasklist manager 10 receives the notification and informs the affected users (step 36). For example, the activity may be executed by users with the role "Manager". Therefore, the tasklist manager 10 forwards the notification to all users with the role "Manager". User 18 receives the notification (step 38) and accepts the request to perform the activity (step 40). In response, the proxy 06 verifies if the user 18 is authorized to execute the activity and confirms the user 18 as the effective executor of the activity (step 42). In one example, the user 18 has to be directly assigned to the activity or has to hold an appropriate active role. The appropriate role must be equivalent to that specified by the workflow engine 04 or one which is higher in the role hierarchy. In addition, the proxy 06 notifies the workflow engine 04 (step 44) such that the workflow engine may update the status of the activity (step 46).

The proxy 06 generates a credential according to the security policy 08 and submits the credential to the user 18 (step 48). A credential is a digital certificate that proves that the user 18 is trusted by the workflow management system 02. In one embodiment of the invention, the credential contains information describing the type of verification, unique identifier of the user, unique identifier of the activity and a digital signature.

In response, the user 18 submits the credential with the request for private information to the proxy 06 (step 52). Although not illustrated, one of ordinary skill in the art will recognize that the user 18 may transfer the credential to another trusted user to perform the activity. Similarly, the trusted user holds a role which is equivalent to that specified by the workflow engine 04 or one which is higher in the role hierarchy.

The proxy 06 verifies the credential and the request at step 54. A credential may be considered valid only if the specified activity in the credential corresponds to the activity. After the verification process, the relevant private information is provided to the user 18 (step 56) who then performs the activity (step 58). Upon completion of the activity, the user 18 notifies the proxy 06 by submitting an activity-completed-notification and the credential (step 60). This is the same credential used for requesting private information at step 52. The proxy 06 verifies the credential and forwards the notification to the workflow engine 04 (step 62). The process is completed when the workflow engine 04 receives the notification and updates the status of the activity (step 64).

Figure 3:
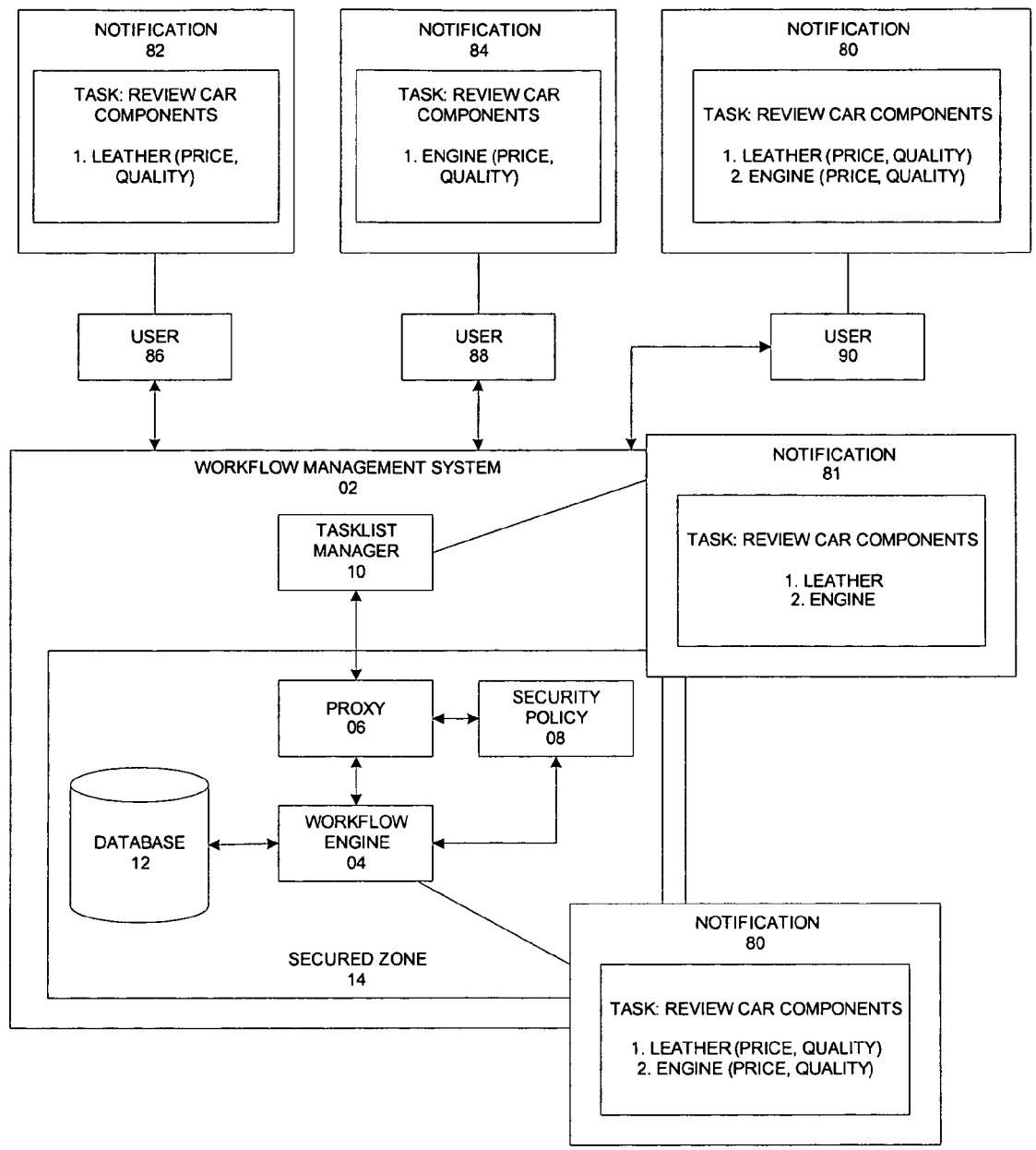
FIG. 3 illustrates an example of users performing a task with the workflow management system in accordance with an embodiment of the invention.

FIG. 3 illustrates an example of users performing a task with the workflow management system 02 in accordance with an embodiment of the invention. In this example, the workflow engine 04 executes a purchasing workflow process including an activity to review car components submitted by various suppliers. The workflow engine 04 provides the security policy 08 with information relating to the activity. The security policy 08 establishes the authentication policy and security policy. In addition, information relating to the activity are classified as public type or private type. In this example, the security policy 08 treats all qualitative or quantitative data as private information. The description of the activity "review car components" and the items to be reviewed "leather and engine" are classified as public information. Data information relating to "price" and "quality" are private information. In addition, the security policy 08 associates the role of the user with the corresponding private data information.

The workflow engine 04 generates a notification 80 and submits the notification 80 to the proxy 06. The proxy 06 consults the security policy 08 to removes private information from the notification 80 to create notification 81. The proxy 06 submits notification 81 to the tasklist manager 10 which distributes the notification 81 to the affected users 86, 88 and 90. The affected users 86, 88, 90 may be identified based on their roles.

All the affected users 86, 88, 90 may accept the activity to review the car components and inform the proxy 06. The proxy 06 verifies the request and provides the users 86, 88, 90 with corresponding notifications 82, 84, 80. The notifications 82, 84, 80 contain relevant private information according to the role of the users 86, 88, 90. As described above, the security policy 08 associates the role of the user with the private information. The proxy 06 works with the security policy 08 to construct notifications 82, 84, 80 with the relevant private information according to the roles of the users 86, 88, 90. User 86 may be a manager responsible for the interior design of a car and accordingly, user 86 will only be concerned with the product "leather" but not "engine". Therefore, the proxy 06 may be configured to provide user 86 with information relating to the product "leather". On the other hand, user 84 is a manager from the engineering department and only the information relating to "engine" is critical or even relevant for him. In another example, user 90 is the chairman of the company and may be concerned with all the car components that are used to build a car. In this case, the proxy 06 provides user 90 with the original notification 80 which includes all the information relating to the activity. Clearly, the invention enables only the right users to have secured access to the relevant information of the activity.

Thus, a method and system for secured execution of activities in a workflow process has been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for executing an activity, the method comprising:
    receiving a notification to execute one of a plurality of activities in a workflow process,
        wherein the notification includes private information and public information relating to the activity,
        wherein the private information includes data associated with execution, and
        wherein the public information includes description for the plurality of activities;
    defining, by the workflow process, an order of execution for the plurality of activities;
    establishing, by the workflow process, interdependencies between the plurality of activities;
    establishing, by the workflow process, which of a plurality of users are to perform each of the plurality of activities in the workflow process;
    removing by a computer processor the private information from the notification to create a public notification;
    providing, via a communication network, the public notification to one or more users affected by the activity among the plurality of users;
    receiving, via the communication network, a request to execute the activity from the one or more users affected by the activity, responsive to providing the public notification;
    verifying credentials of the request; and
    providing, via the computer processor and the communication network, the private information to the one or more users affected by the activity after verifying the credentials of the request.

2. The method of claim 1, wherein providing the private information comprises identifying the one or more users affected by the activity based on roles associated with each of the plurality of users.

3. The method of claim 1, wherein the private information further includes secured information of the activity.

4. The method of claim 1, wherein verifying credentials of the request comprises verifying a credential submitted by the one or more users affected by the activity, the credential certifying a permission to execute the activity.

5. The method of claim 4, wherein verifying credentials of the request comprises comparing the roles of the one or more users affected by the activity to a stated role in the notification.

6. The method of claim 5, wherein the roles of the one or more users affected by the activity are at least equivalent to or higher than the stated role in terms of a role hierarchy.

7. The method of claim 4, wherein the credential is transferable to another user among the plurality of users.

8. The method of claim 1, wherein providing the private information comprises providing a relevant portion of the private information to the one or more users affected by the activity.

9. The method of claim 8, wherein the relevant portion of the private information is determined by the roles of the one or more users affected by the activity.

10. A system comprising:
a computer processor;
a communication network coupled with the processor;
a workflow engine coupled with the computer processor to receive a notification via the communication network to execute one of a plurality of activities in a workflow process,
wherein the notification includes private information and public information relating to the activity,
wherein the private information includes data associated with execution, and
wherein the public information includes description for the plurality of activities,
the workflow process to:
define an order of execution for the plurality of activities,
establish interdependencies between the plurality of activities, and
establish which of a plurality of users are to perform each of the plurality of activities in the workflow process;
a proxy component coupled with the computer processor and the work flow engine to remove the private information from the notification to create a public notification;
a tasklist manager coupled with the computer processor and the proxy component to provide the public notification to one or more users affected by the activity among the plurality of users;
the workflow engine to further receive a request to execute the activity from the one or more users affected by the activity responsive to the public notification;
a security policy component coupled with the computer processor and the workflow engine to verify credentials of the request; and
the proxy component to further provide the private information to the one or more users affected by the activity after verifying credentials of the request.

11. The system of claim 10, wherein the security policy component to further identify the one or more users affected by the activity based on the roles associated with each of the plurality of users.

12. The system of claim 10, wherein the private information further includes secured information of the activity.

13. The system of claim 10, wherein the proxy component to verify credentials of the request comprises the proxy component to verify a credential submitted by the one or more users affected by the activity, the credential certifying a permission to execute the activity.

14. The system of claim 13, wherein the proxy component to verify credentials of the request comprises the proxy component to compare the roles associated with each of the one or more users affected by the activity to a stated role in the notification.

15. The system of claim 14, wherein the roles associated with each of the one or more users affected by the activity are at least equivalent to or higher than the stated role in terms of a role hierarchy.

16. The system of claim 13, wherein the credential is transferable to another user among the plurality of users.

17. The system of claim 10, wherein the proxy component to provide the private information comprises the proxy component to provide a relevant portion of the private information to the one or more users affected by the activity.

18. The system of claim 17, wherein the relevant portion of the private information is determined by the roles associated with each of the one or more users affected by the activity.

19. A machine-readable medium comprising instructions, which, when executed by a machine, cause the machine to execute an activity in a workflow process management system comprising:
receiving a notification to execute one of a plurality of activities in a workflow process,
wherein the notification includes private information and public information relating to the activity,
wherein the private information includes data associated with execution, and
wherein the public information includes description for the plurality of activities;
defining, by the workflow process, an order of execution for the plurality of activities;
establishing, by the workflow process, interdependencies between the plurality of activities;
establishing, by the workflow process, which of a plurality of users are to perform each of the plurality of activities in the workflow process;
removing the private information from the notification to create a public notification;
providing the public notification to one or more users affected by the activity among the plurality of users;
receiving a request to execute the activity from the one or more users affected by the activity responsive to providing the public notification;
verifying credentials of the request; and
providing the private information to the one or more users affected by the activity after verifying credentials of the request.

20. The machine-readable medium of claim 19, wherein providing the private information comprises identifying the one or more users affected by the activity from among the plurality of users based on roles associated with each of the plurality of users.

21. The machine-readable medium of claim 19, wherein the private information further includes secured information of the activity.

22. The machine-readable medium of claim 19, wherein verifying the credentials of the request comprises verifying a credential submitted by the one or more users affected by the activity, the credential certifying a permission to execute the activity.

23. The machine-readable medium of claim 22, wherein verifying the credentials of the request comprises comparing the roles of the one or more users affected by the activity to a stated role in the notification.

24. The machine-readable medium of claim 23, wherein the roles of the one or more users affected by the activity are at least equivalent to or higher than the stated role in terms of a role hierarchy.

25. The machine-readable medium of claim 22, wherein the credential is transferable to other users among the plurality of users.

26. The machine-readable medium of claim 19, wherein providing the private information comprises providing a relevant portion of the private information to the one or more users affected by the activity.

27. The machine-readable medium of claim 26, wherein the relevant portion of the private information is determined by the roles of the one or more users affected by the activity.

* * * * *